(12) United States Patent
Harris

(10) Patent No.: US 7,635,011 B2
(45) Date of Patent: Dec. 22, 2009

(54) ASSEMBLY FOR DELIVERING SOLID PARTICULATE MATTER FOR LOADING

(76) Inventor: Jack Harris, 6638 Pecue La., Baton Rouge, LA (US) 70817

( * ) Notice: Subject to any disclaimer, the term of this patent is extended or adjusted under 35 U.S.C. 154(b) by 545 days.

(21) Appl. No.: 11/429,795

(22) Filed: May 6, 2006

(65) Prior Publication Data

US 2007/0267091 A1    Nov. 22, 2007

(51) Int. Cl.
*B65B 1/04* (2006.01)
(52) U.S. Cl. .............. 141/93; 141/65; 141/85; 141/285
(58) Field of Classification Search ............ 141/8, 141/65, 66, 67, 85, 93, 285
See application file for complete search history.

(56) References Cited

U.S. PATENT DOCUMENTS 4,095,625 A * 6/1978 Marpe .................. 141/93
6,251,152 B1 * 6/2001 Thiele .................. 55/318
6,736,171 B2 * 5/2004 Harris .................. 141/67

* cited by examiner

*Primary Examiner*—Gregory L Huson
*Assistant Examiner*—Jason K Niesz
(74) *Attorney, Agent, or Firm*—Keaty Law Firm, LLC

(57) ABSTRACT

An assembly for transferring solid particulate matter has a pressurized vessel for retaining a pre-determined quantity of the solid material. A transfer conduit connected to the vessel carries the solid material to a loading vessel, be it a processing tank, a storage vessel, or any other similar container. A discharge nozzle carried by a distant end of the transfer conduit has a plurality of perforations that allow removal of the dust particles by suction from the discharge nozzle. A separate dust removal conduit is secured immediately adjacent to the discharge nozzle for removal of the dust particles away from the discharge nozzle.

13 Claims, 7 Drawing Sheets

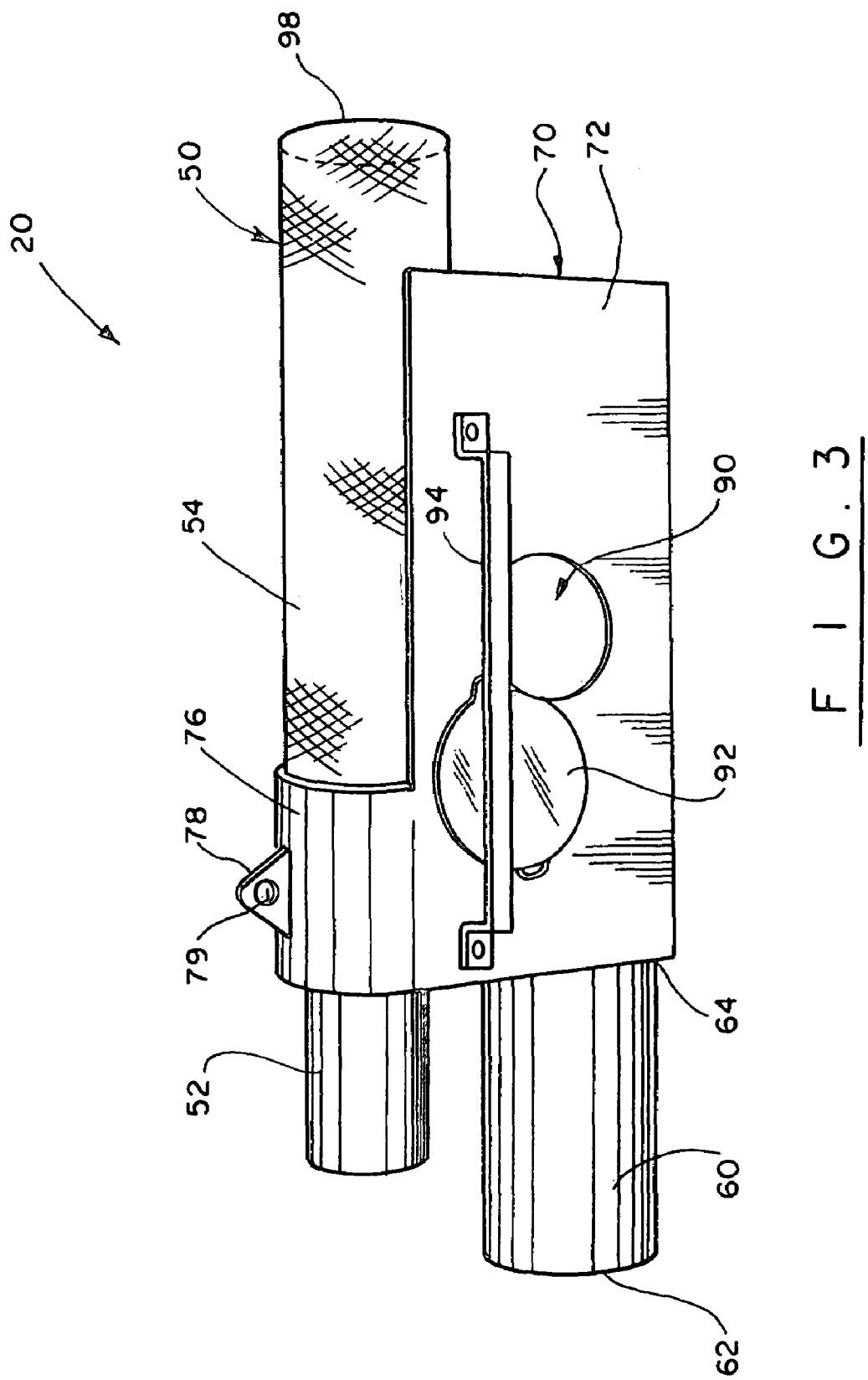
F I G. 3

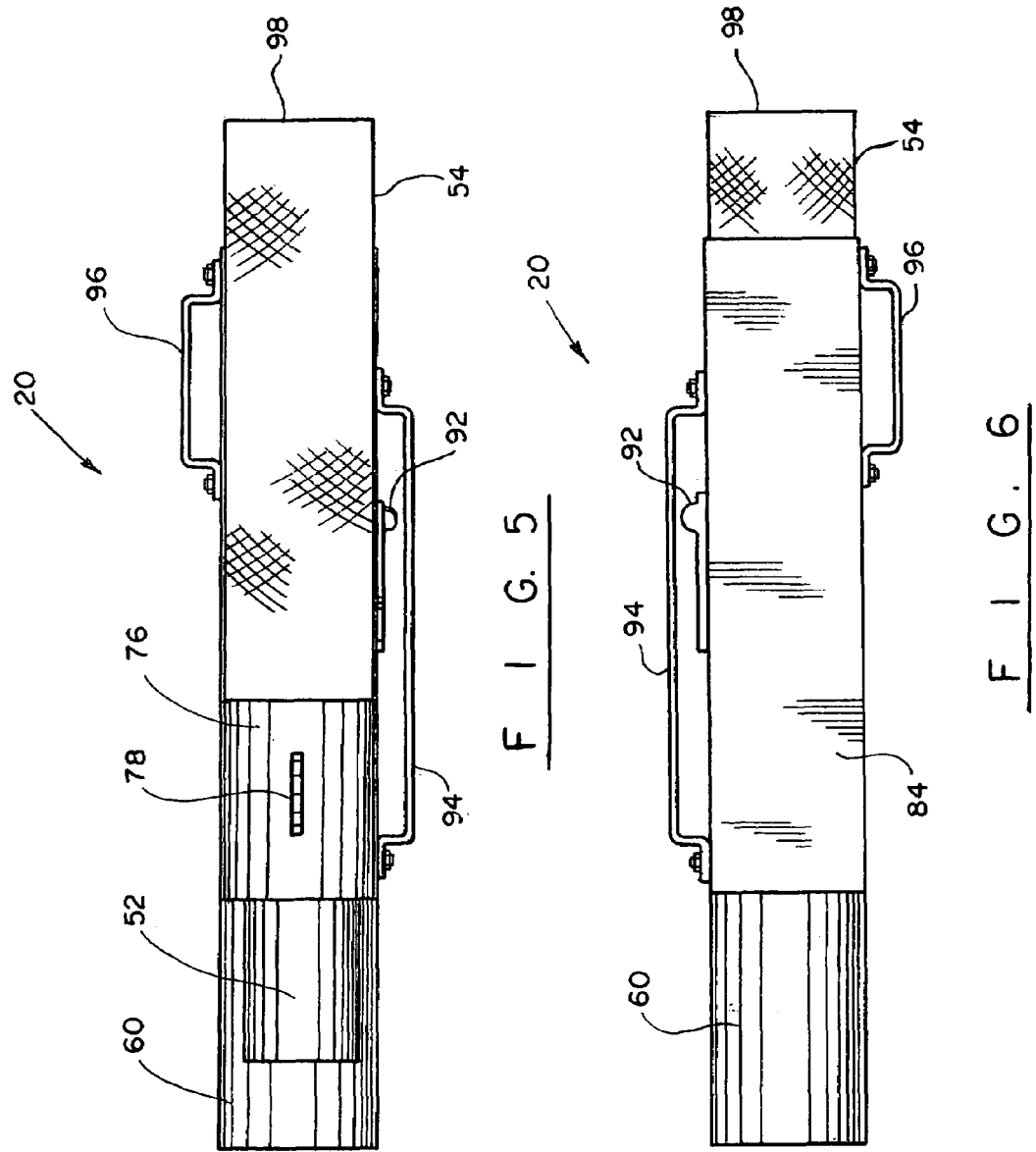

ASSEMBLY FOR DELIVERING SOLID PARTICULATE MATTER FOR LOADING

BACKGROUND OF THE INVENTION

This invention relates to an assembly for transferring solid particulate matter, with the assistance of pressurized airflow into a loading container, which may be a storage container, a processing tank, or other similar vessel. Even more particularly, the present invention relates to an assembly for transferring solid pelletized material, such as for instance a catalyst substance, into a loading container, wherein the pelletized material generates dust during the transfer process.

Many industries require transport, or delivery of solid particles from storage area or delivery container into another storage container or a processing tank. One of such industries is a chemical industry where pre-determined quantities of solid pellets are loaded into a processing vessel or converter. For instance, sulfuric acid manufacturing plants use a vanadium catalyst, which is supplied in a pelletized form in bags or drums. The catalyst pebbles then need to be loaded into the converter or container where a chemical reaction for generation of gases takes place.

Conventionally, acid processing tanks are upright vessels with a closed top. A plurality of levels or beds of catalyst is contained in each converter vessel. The loading takes place through the top of the converter in the first bed of catalyst and through opening in the side wall of the converter in lower beds. During the loading operation, the catalyst pellets, being delivered by gravity, generate a significant amount of dust. The personnel who perform the loading operation, by necessity have to wear face masks, respirators, and similar protective gear to avoid breathing in the dust that heavily permeates the area where the loading takes place.

Similar conditions exist in loading operations of other solid particles, for instance, during grain loading into silos and other storage facilities. The loading space has to be equipped with adequate ventilation to minimize the dust particles retention in the loading area and creation of health hazards in such areas.

A useful assembly for handling solid particulate matter is disclosed in U.S. Pat. No. 6,736,171, which discloses the use of a discharge nozzle carried by a distant end of a discharge conduit. The nozzle is also connected to a dust collection container. A vacuum-assisted suction force is created in the dust collection container to facilitate entrapment of dust particles generated during transfer of the solid material through the discharge container and carrying of the dust particles away from the discharge opening of the discharge nozzle into the dust collection container.

The discharge nozzle of the ’171 patent has a double-walled construction with an inner conduit and an outer sleeve with a plurality of air intake openings formed in the body of the sleeve. In this design, the suction force is oriented substantially transversely to the flow of material through the nozzle, and there is no means to regulate the air flow. While the assembly of the ’171 patent works satisfactory in many situations, it was noted that the suction force sometimes interferes with the speed of the particle delivery.

The present invention contemplates elimination of drawbacks associated with the prior design and provision of an improved loading assembly that prevents dust from escaping the loading conduits or hoppers and creating hazardous conditions in the loading area.

SUMMARY OF THE INVENTION

It is, therefore, an object of the present invention to provide an improved loading assembly for transferring solid pelletized items from a storage facility to a loading container, while avoiding spreading of dust in the loading area.

It is another object of the present invention to provide an improved loading assembly for moving solid pelletized items with the help of air pressure from a storage container to a processing tank.

It is a further object of the present invention to provide an assembly for loading pellets of sulfuric acid catalyst, while removing dust generated by the friction of pellets before the dust escapes the loading and transfer conduits.

It is still a further object of the present invention to provide a discharge nozzle that allows diverting the dust particles away from a discharge opening thus preventing escape of the dust particles into the atmosphere.

it is also an object of the present invention to provide an assembly for delivering solid particulate matter, wherein the dust particles are removed from the discharge nozzle with the assistance of a suction force that can be regulated by an operator.

These and other objects of the present invention are achieved through a provision of an assembly adapted for transferring solid particulate matter, such as pellets, to a loading vessel. The assembly has an upright vessel that retains a pre-determined quantity of the pellets. The vessel is pressurized, and a discharge conduit is fluidly connected, through a transfer conduit, to the bottom of the vessel to assist in moving the pellets from the vessel to a loading container, be it a processing tank or a storage container.

The discharge conduit carries a specially designed discharge nozzle assembly, which is also connected to a dust removal conduit. The discharge nozzle assembly has a discharge conduit, a major part of the length of which is provided with perforations allowing removal of dust particles threrethrough. The perforations are preferably small enough to prevent the transferred solid particulate matter to escape from the discharge conduit.

The discharge nozzle assembly comprises a housing that supports at least a part of the discharge conduit above a channel formed in the housing. A suction force is created in the channel, pulling dust particles from the discharge conduit and moving the dust particles away from the loading vessel into a dust collection container. A flap valve closes an opening in a wall of the housing to allow regulating the speed of the suction air flow in the channel. If an operator detects interference of the suction air flow with the speed of movement of the solid particulate matter through the discharge nozzle, the operator can partially open a normally closed opening, this reducing the suction air flow speed.

BRIEF DESCRIPTION OF THE DRAWINGS

Reference will now be made to the drawings, wherein like parts are designated by like numerals, and wherein FIG. 1 is a schematic view of the loading assembly in accordance with the present invention.

FIG. 2 is a right-hand side view of a discharge nozzle for use in the loading assembly of the present invention, with the flow regulating member in a closed position.

FIG. 3 is a right-hand side view of a discharge nozzle for use in the loading assembly of the present invention, with the flow regulating member in an open position.

FIG. 5 is a top view of the discharge nozzle of the present invention.

FIG. 6 is a bottom view of the discharge nozzle of the present invention.

DETAILED DESCRIPTION OF THE PREFERRED EMBODIMENT

Figure 1:
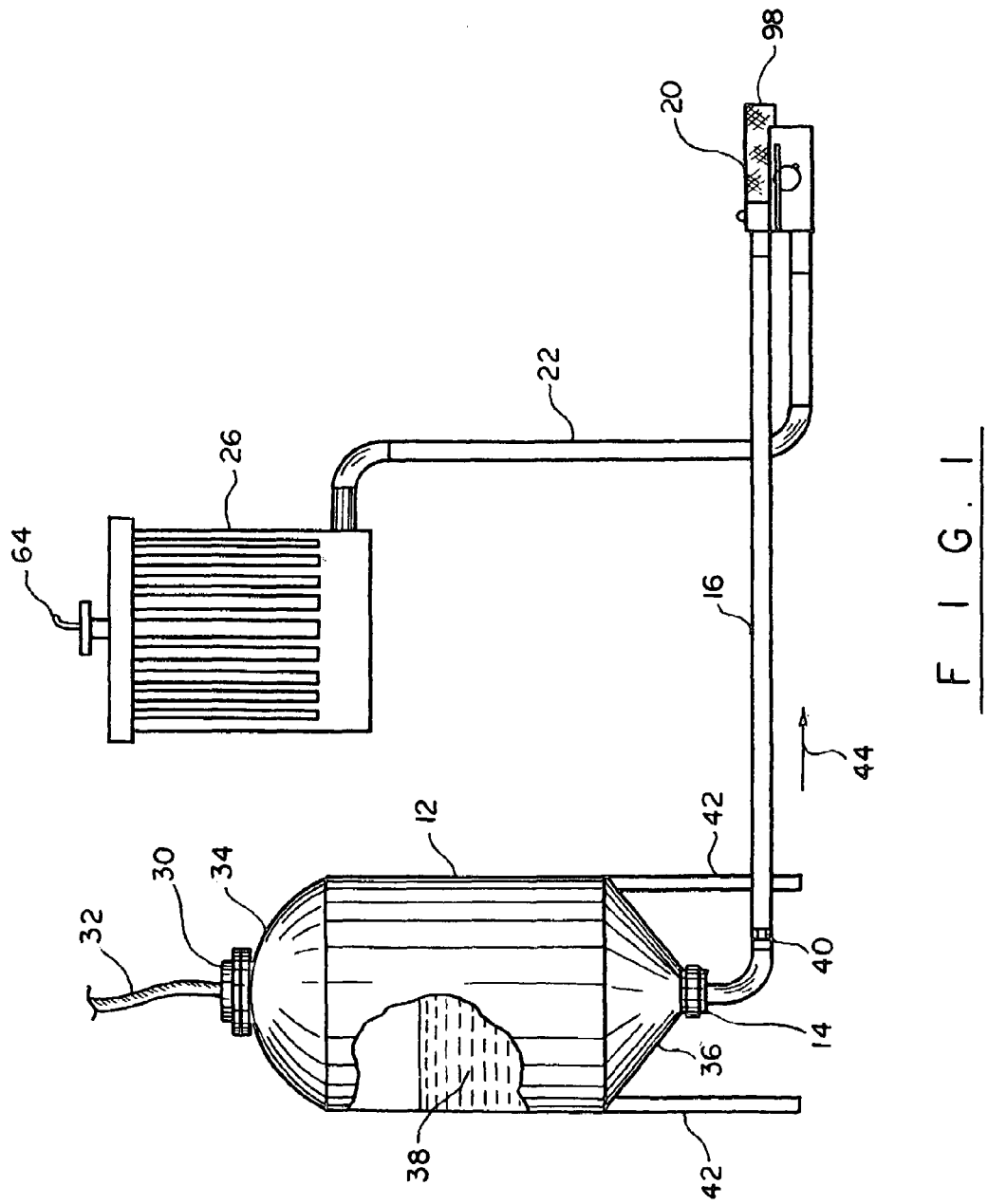

Turning now to the drawings in more detail, the assembly of the present invention is designated by numeral 10 in FIG. 1. As can be seen in the drawing, the assembly 10 comprises a pressurized container 12 having a bottom discharge 14 in fluid communication with a transfer conduit 16. The transfer conduit 16 is provided with a discharge nozzle assembly 20 at the distant end thereof. A dust removal conduit 22 is in fluid communication with the discharge nozzle assembly 20. The dust conduit 22 is connected to the discharge nozzle assembly 20 upstream from a discharge opening 98 of the discharge nozzle assembly 20. The dust removal conduit 22 is connected to a dust collection container, or vessel 26 and is in fluid communication therewith.

The pressurized container 12 is provided with a top lid 30 that allows loading of the container 12 from the top. The items to be transferred, for instance pellets 38 of the catalyst, are loaded by gravity into the upright container 12. A conduit 32 fluidly connects the lid 30 with a source of air pressure (not shown). A regulating valve (not shown) is mounted in the conduit 32 for regulating the air pressure within the container 12. The container 12 is vertically oriented to facilitate movement of the solid particulate matter loaded into the container 12 from the top 34 to the bottom 36 thereof.

The bottom 36 of the container 12, if desired, can be formed as an inverted cone to facilitate movement of the pelletized solid material in the interior of the container 12 toward to apex of the cone, which serves as a discharge outlet of the container 12. As can be seen in FIG. 1, the solid particles occupy the lower portion of the container 12 with the top portion 34 being filled with pressurized air to push the pellets downwardly and into the discharge 14 and then into the transfer conduit 16. A shut off valve 40 is positioned in the transfer conduit 16 to regulate movement of solid particles from the container 12 downstream into the transfer conduit 16.

The container 12 is schematically shown as resting on a plurality of supporting legs 42 to allow the bottom 36 of the container 12 to be elevated above the conduit 16. The height of the supporting legs 42 differs depending on the types of container design used.

The solid pellets 38 move through the bottom discharge 14 into the conduit 16 in the direction away from the container 12, as schematically shown by an arrow 44. The air pressure in the transfer conduit 16 is maintained at a sufficient level to allow movement of the pellets 38 through the transfer conduit 16 towards the discharge nozzle assembly 20. While the pressure in the transfer conduit 16 and the vessel 12 will necessarily differ depending on the material being transferred by the assembly 10, one of the embodiments of the present invention for transferring sulfuric acid catalysts provides for pressurizing the vessel 5 to 20 p.s.i. The discharge 14 on the bottom of the container 12 opens once the pre-determined pressure is reached. In that particular embodiment, a compressor generating up to 300 cubic feet per minute (cfm) is used.

As the pelletized items 38 move through the vessel 12 into the conduit 16, they necessarily strike against each other; the friction causes small particles to be chipped off from the pellets 38, generating dust that also travels through the container 12 and the transfer conduit 16. The tiny solid particles then travel along the transfer conduit 16 and reach the discharge nozzle assembly 20. To entrap the dust, the present invention provides for the use of a special discharge nozzle assembly that entraps substantially all dust before it exits the discharge opening 24.

The discharge nozzle assembly 20 comprises a discharge conduit 50, which comprises a proximate portion 54 and a distal portion 54. The portions 52 and 54 are fixedly securely connected to each and extend in a co-axial relationship to each other. The portions 52 and 54 have approximately the same size inner diameter openings 56. The portion 52 has a solid wall construction, while the portion 54 is formed with a plurality of openings that extend through the wall of the portion 54. The portion 54 may be formed from a mesh material, if desired, or from a solid material with a plurality of small perforations. The perforations are preferably smaller in size than the size of the pellets 38, allowing only dust to escape the through the perforations, while retaining the pellets 38 within the conduit portion 54.

The discharge nozzle assembly 20 further comprises a dust removal conduit 60 mounted below the discharge conduit 50. The dust removal conduit 60 has a solid wall construction and is provided with a proximate end 62 and a distal end 64. The proximate end 62 is fluidly connected with the dust collection vessel 26 by the conduit 22. The interior of the dust collection vessel 26 is connected by a means 64 to a source of pressurized air, which creates a suction force across the interior of the conduits 22 and 60 to facilitate moving of the dust particles away from the discharge nozzle assembly 20 and into the vessel 26.

The discharge conduit assembly 20 further comprises a hollow housing 70, which secures the conduits 50 and 60 together. The housing 70 comprises a right-side plate 72, a left-side plate 74, and a connecting yoke 76, which extends between the side plates 72 and 74. The plates 72 and 74 are each secured to the conduits 50 and 60, while the yoke 76 is secured to the conduit 50 and extends, in part, over the conduit 20. The yoke 76 carries a lifting pad eye 78, which has an opening 79 to allow suspension of the nozzle assembly 20. Suspending of the discharge nozzle assembly, which may be difficult to handle when the pellets move through the nozzle conduit 54, makes it easier for the operator to retain in a suspended position above a loading vessel. The plates 72, 74 extend along a major part of the perforated portion 54 of the conduit 50.

The housing has a front plate 80, a rear plate 82 and a bottom plate 84. The bottom plate 84 extends transversely to the side plates 72, 74 and secures them together. The distal end 64 of the conduit 60 is secured to the front plate 80. An open-top channel 86 is formed between the interior walls of the plates 72, 74. A bottom of the conduit 50 is in fluid communication with the channel 86. The distal end 64 of the conduit 60 opens into the channel 86, establishing a fluid communication between the vessel 26 and the channel 86.

The air flow providing suction force to the dust particles moves along a substantial length of the discharge conduit 54, providing increased dust removal capability to the nozzle assembly 20. The air flow of the suction force moves in a direction opposite to the direction of the pellets' movement. As a result, the dust removal capability of the assembly is further enhanced.

Figure 2:
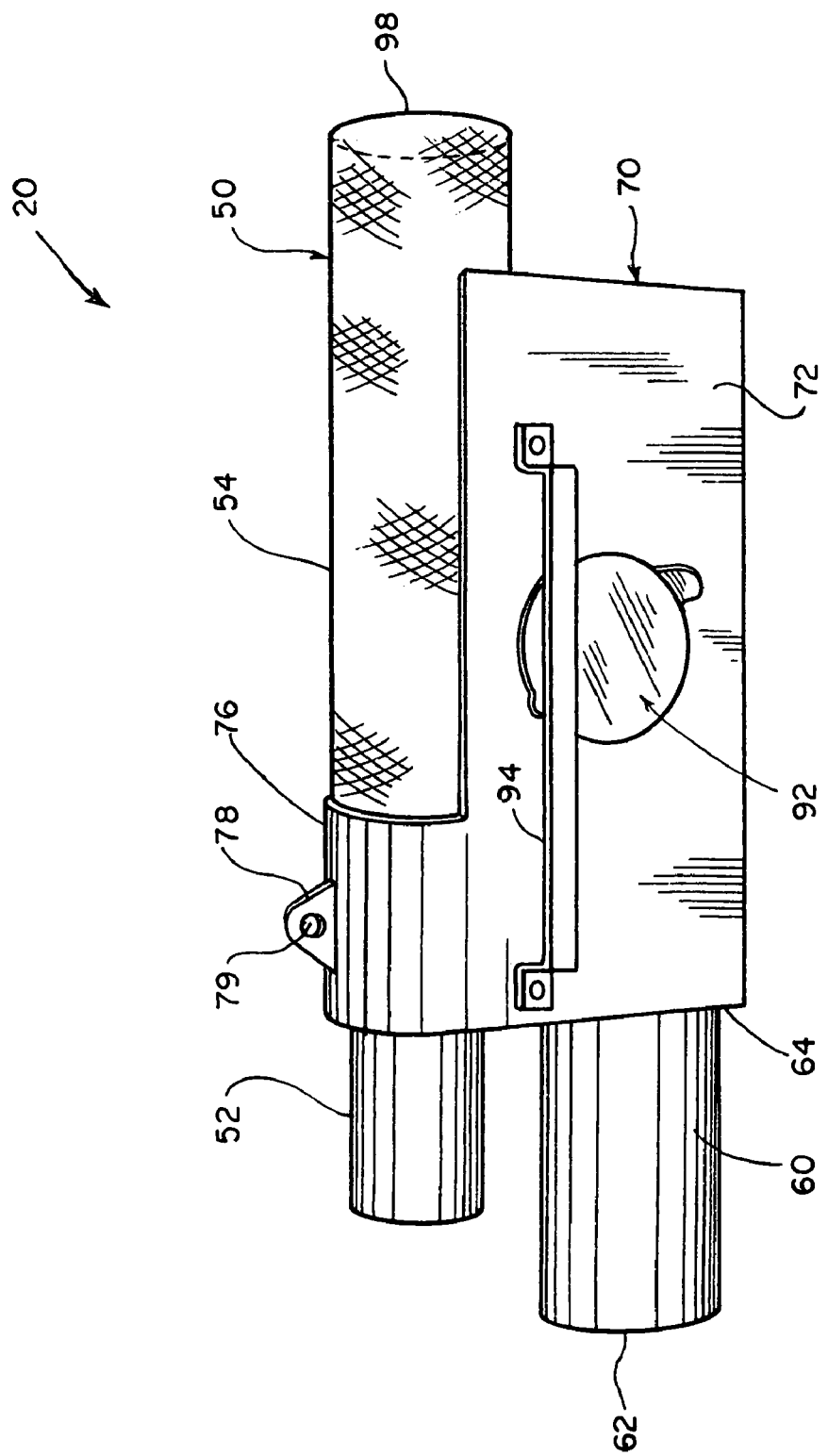
Figure 4:
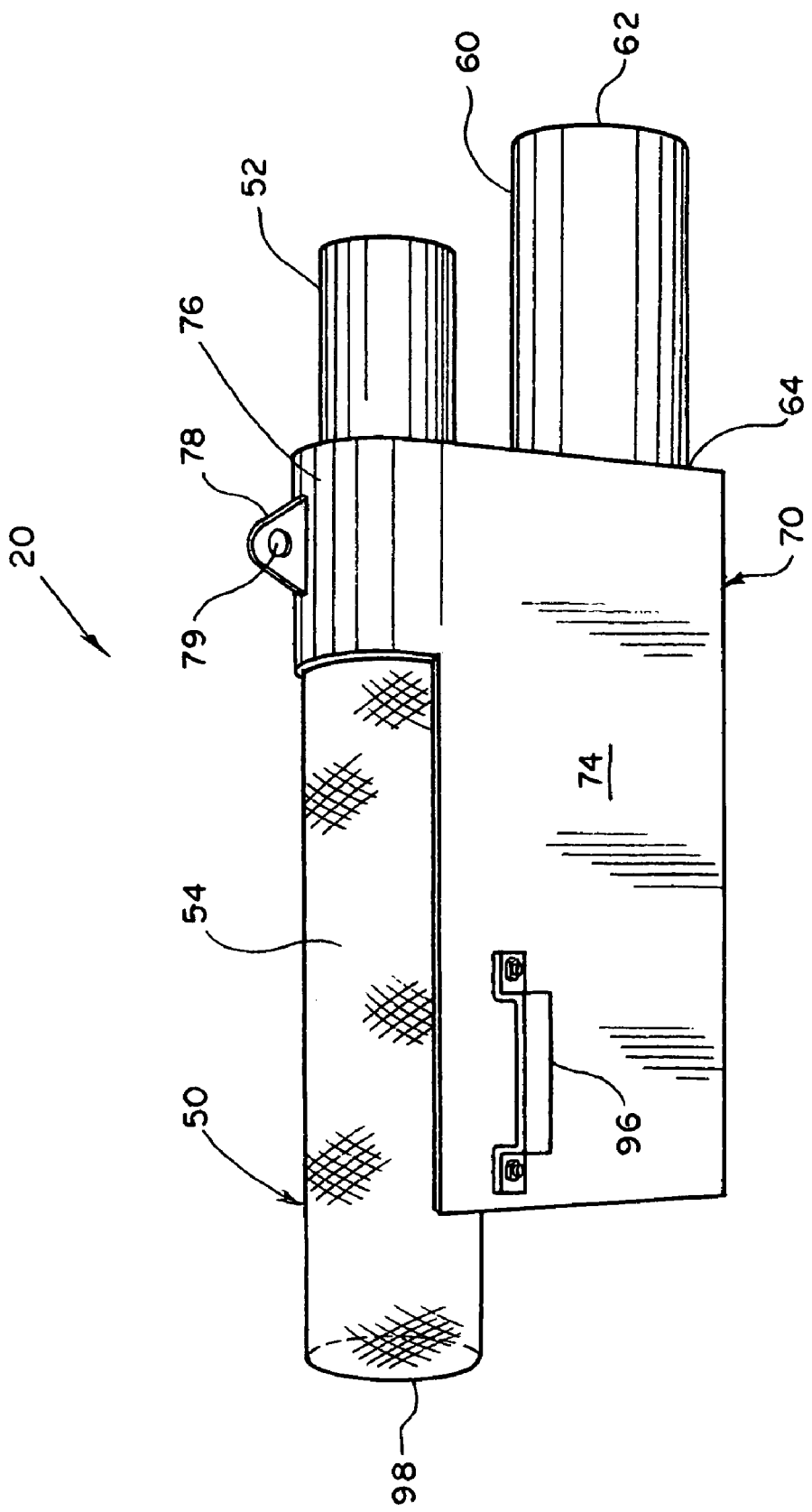
FIG. 4 is a left side view of the discharge nozzle in accordance of the present invention.
Figure 7:
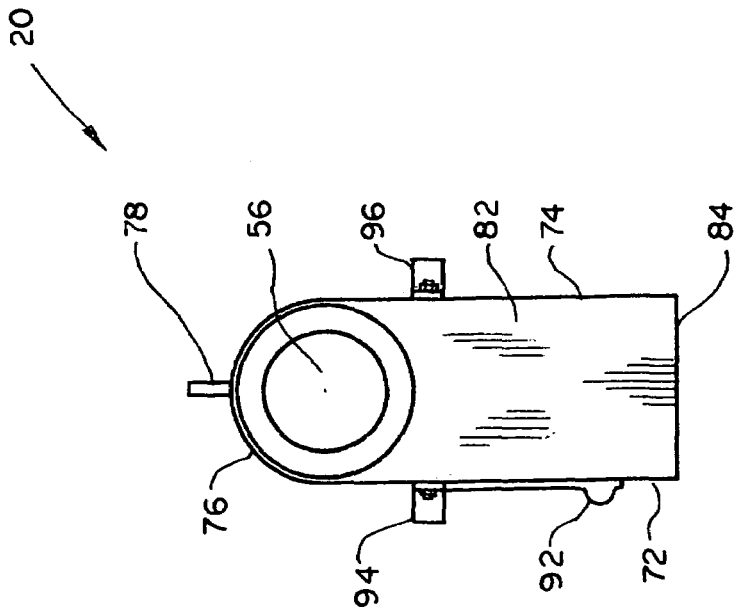
FIG. 7 is a proximal end view of the discharge nozzle of the present invention.
Figure 8:
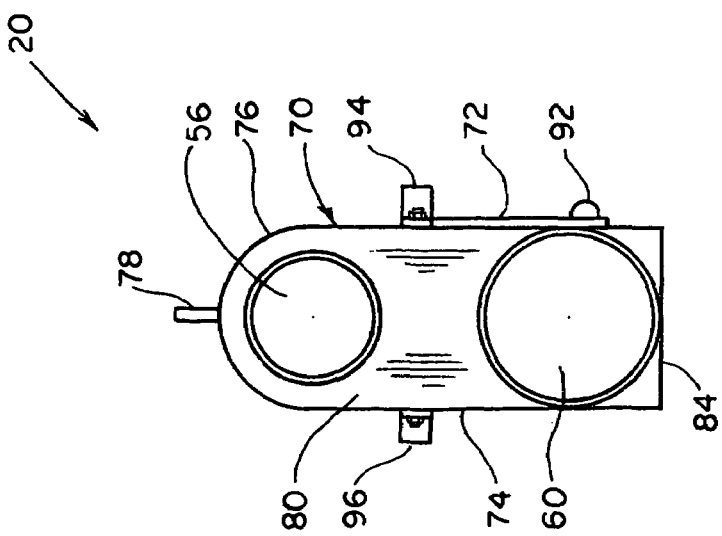
FIG. 8 is a distal end view of the discharge nozzle of the present invention.
Figure 9:
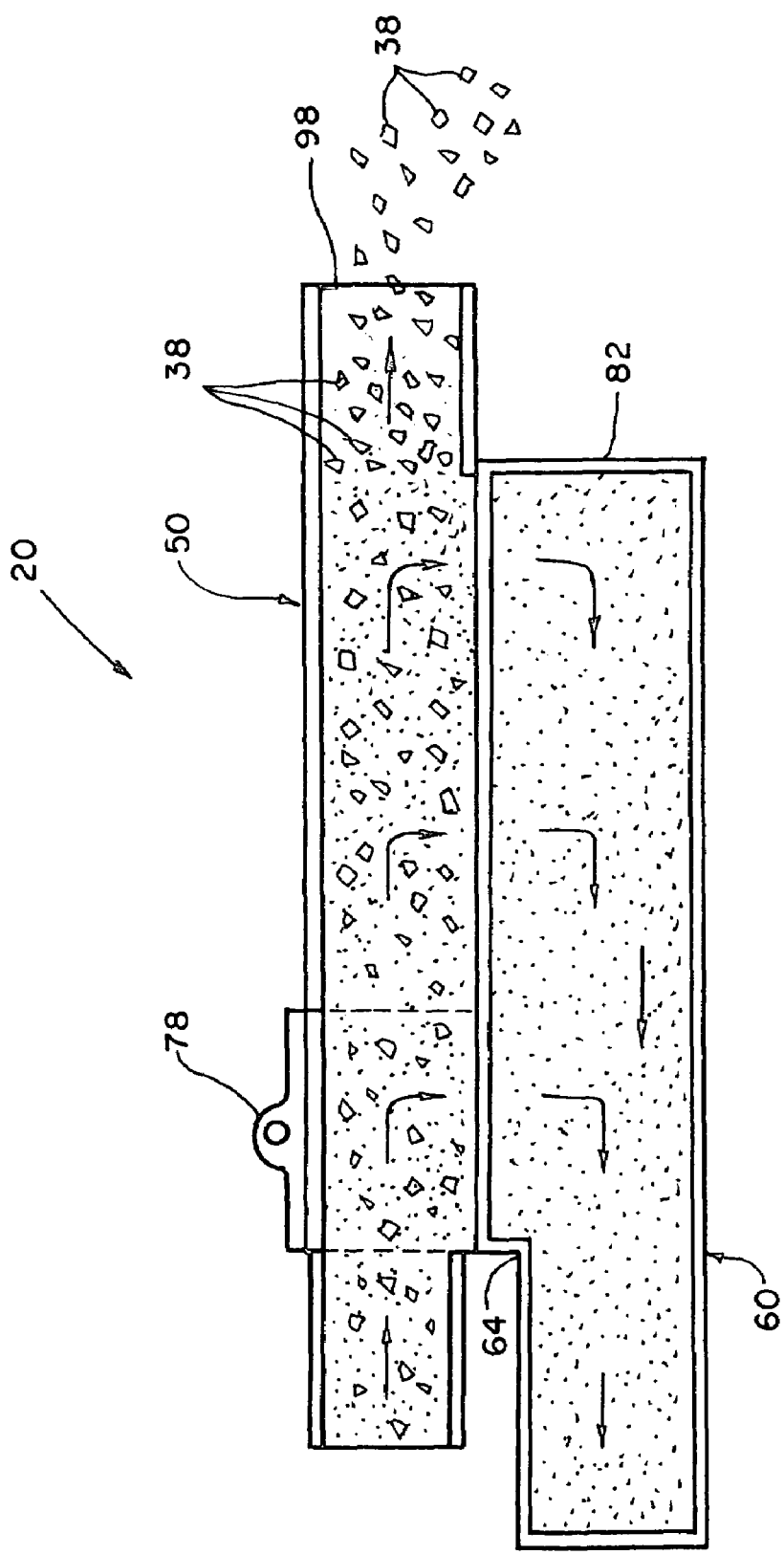
FIG. 9 is a cross-sectional view illustrating the movement of palletized material through the discharge nozzle and removal of dust particles.

The plate 72 is provided with an opening 90, which is normally closed with a flap valve 92. The opening 90 communicates with the channel 86. The flap valve 92 moves across the opening 90, closing the opening 90 in a desired manner. The flap valve 92 moves from a fully closed position shown in FIG. 2 to a fully open position shown in FIG. 3, or any position therebetween. The flap valve 92 assist in regulating the flow of air in the channel 86 so as not to impede movement of the particulate matter through the discharge conduit 54.

When an operator detects the air flow across the channel 86 interfering with the speed of movement of the palletized material through the discharge conduit 54, the operator slightly opens the normally closed hinged flap valve 92, reducing the suction force, which pulls the dust particles from the discharge conduit 54 into the channel 86. As a result the speed of movement of the palletized material through the discharge conduit 54 increases. When the palletized material moves at the desired speed, the operator closes the flap valve 92, moving it into a position shown in FIG. 2.

The plate 72 is provided with a handle 94, and the plate 74 is provided with a handle 96. The handles 92 and 94 allow the operator to grab and hold the discharge nozzle assembly 20 and move the assembly 20 for depositing the palletized material in a desired location within a container or vessel.

Substantially all dust particles, or a significant amount thereof is diverted from reaching the discharge opening 24 and escaping into the atmosphere. During a catalyst loading operation, the discharge nozzle end 98 is placed in the converter and the catalyst is distributed as required.

The loading assembly of the present invention allows scrubbing of the catalysts or other pelletized solid particles and remove dust from the loading conduits before they escape into the surrounding area or reach the processing vessels, converters, storage containers, and the like. A careful balance must be observed between the amount of pressure created in the vessel 12 and the dust removal conduit 22. Similarly, if the discharge nozzle 20 is selected for high-speed discharge, the dust particles may not have a chance to be directed into the flow moving towards the conduit 22.

The dust collection vessel 26 may have a capacity of moving 3,000 cubic feet per minute of the airflow. If the conduit 22 is about 3-4 inches in diameter, the capacity of the vessel 26 is sufficient to create the necessary vacuum in moving the dust through the conduit 22. Of course, the vacuum generated in the conduit 22 and the pressure values in the vessel 12 can be different for different types of solid particulate matter.

Many changes and modifications can be made in the apparatus of the present invention without departing from the spirit thereof. I, therefore, pray that my rights to the present invention be limited only by the scope of the appended claims.

I claim:

1. An assembly for delivering solid particulate matter for loading, comprising:
    a pressurized vessel for retaining a pre-determined quantity of the solid particulate matter;
    a transfer conduit for transferring the solid particulate matter from the pressurized vessel for loading, said transfer conduit carrying a discharge nozzle assembly with a discharge opening on a distant end thereof, said discharge nozzle assembly having a housing defining an open channel and a discharge conduit having a plurality of perforations, at least a portion of said discharge conduit being in fluid communication with said channel, wherein said housing comprises a closed bottom, a pair of side plates, a front wall, a rear wall, and a yoke extending over at least a portion of the discharge conduit; and
    a means mounted upstream from said discharge opening for removing dust particles from said discharge conduit, said dust removing means being in fluid communication with said channel.

2. The assembly of claim 1, wherein said discharge conduit is secured between said yoke and the side plates.

3. The assembly of claim 1, wherein each of said side plates is provided with a handle to facilitate holding of the discharge muzzle assembly by an operator.

4. The assembly of claim 1, wherein said yoke is provided with a pad eye to facilitate suspension of the discharge nozzle assembly.

5. The assembly of claim 1, wherein said nozzle assembly is provided with a means for regulating suction air flow within said channel.

6. The assembly of claim 5, wherein said suction air flow regulating means comprises a normally closed opening formed in one of the side plates, said opening communicating with the channel, said opening being normally closed with a flap valve.

7. The assembly of claim 6, wherein said flap valve is hingedly secured for movement between a position closing the opening and a plurality of selected positions away from said opening.

8. An assembly for delivering solid particulate matter for loading, comprising:
    a pressurized vessel for retaining a pre-determined quantity of the solid particulate matter;
    a transfer conduit for transferring the solid particulate matter from the pressurized vessel for loading, said transfer conduit carrying a discharge nozzle assembly with a discharge opening on a distant end thereof, said discharge nozzle assembly having a housing defining an open channel and a discharge conduit having a plurality of perforations, at least a portion of said discharge conduit being in fluid communication with said channel;
    a means mounted upstream from said discharge opening for removing dust particles from said discharge conduit, said dust removing means being in fluid communication with said channel and generating a suction force across said channel; and
    a means secured to said housing for regulating air flow within said channel, wherein the flow regulating means comprises a normally closed opening formed in said housing, said opening communicating with the channel, said opening being normally closed with a flap valve.

9. The assembly of claim 8, wherein said flap valve is hingedly secured for movement between a position closing the opening and a plurality of selected positions away from said opening.

10. An assembly for delivering solid particulate matter for loading, comprising:
    a pressurized vessel for retaining a pre-determined quantity of the solid particulate matter;
    a transfer conduit for transferring the solid particulate matter from the pressurized vessel for loading, said transfer conduit carrying a discharge nozzle assembly with a discharge opening on a distant end thereof, said discharge nozzle assembly having a housing defining an open channel and a discharge conduit having a plurality of perforations, at least a portion of said discharge conduit being in fluid communication with said channel, wherein said housing comprises a closed bottom, a pair of side plates, a front wall, a rear wall, and a yoke extending over at least a portion of the discharge conduit;

a means mounted upstream from said discharge opening for removing dust particles from said discharge conduit, said dust removing means being in fluid communication with said channel and generating a suction force across said channel; and a means secured to said housing for regulating air flow within said channel.

11. The assembly of claim 10, wherein said discharge conduit is secured between said yoke and the side plates.

12. The assembly of claim 10, wherein each of said side plates is provided with a handle to facilitate holding of the discharge muzzle assembly by an operator.

13. The assembly of claim 10, wherein said yoke is provided with a pad eye to facilitate suspension of the discharge nozzle assembly.

* * * * *